United States Patent [19]

Durand et al.

[11] Patent Number: 5,445,657
[45] Date of Patent: Aug. 29, 1995

[54] POLYFUNCTIONAL POLYISOBUTENES, THEIR PREPARATION, THEIR FORMULATION AND THEIR USE

[75] Inventors: Jean-Pierre Durand, Chatou; Daniel Binet, Rueil Malmaison; Patrick Gateau, Maurepas; Roger Bregent, Oiville sur Montcient, all of France

[73] Assignee: Institut Francais du Petrole, Rueil-Malamison, France

[21] Appl. No.: 261,910

[22] Filed: Jun. 16, 1994

[30] Foreign Application Priority Data

Jun. 16, 1993 [FR] France ................... 93 07354

[51] Int. Cl.$^6$ .............................................. C10L 1/18
[52] U.S. Cl. ............................... 44/459; 44/331; 44/394; 525/285; 525/379; 525/380; 525/381; 525/382; 525/384; 525/327.4; 525/327.6; 526/271
[58] Field of Search .............. 44/331, 393, 394, 459; 525/285, 379, 380, 381, 382, 384, 327.4, 327.6; 526/271

[56] References Cited

U.S. PATENT DOCUMENTS 3,318,851  5/1967  Nicholls et al. .............. 526/271
4,370,454  1/1983  Messmer et al. ............. 526/271

FOREIGN PATENT DOCUMENTS 0542726   5/1993   European Pat. Off. .
203553   10/1983   Germany .
WO90/03359  4/1990   WIPO .
WO91/04959  4/1991   WIPO .
WO93/06194  4/1993   WIPO .

OTHER PUBLICATIONS

Database WPI, Section Ch, Week 8435, Derwent Publications Ltd., Class A95, AN 84–216314 (abstract of JP-A-59 126 496). Jul. 1984.

*Primary Examiner*—Prince Willis, Jr.
*Assistant Examiner*—Cephia D. Toomer
*Attorney, Agent, or Firm*—Millen, White, Zelano, & Branigan

[57] ABSTRACT

Chlorine-free polyfunctional polyisobutenes are described that can be modified by amines, alcohols and/or amino alcohols to result in additives that can be used in the petroleum field in particular in fuels and engine lubricants.

They are prepared by radical terpolymerization of isobutene, maleic anhydride and polyisobutene having an average content of "exo" end double bonds of at least 50%.

12 Claims, No Drawings

POLYFUNCTIONAL POLYISOBUTENES, THEIR PREPARATION, THEIR FORMULATION AND THEIR USE

This invention relates to new polyfunctional polyisobutenes that are free of chlorine, their preparation, their chemical modification and their use, particularly as additives for fuels and lubricants.

In the field of petroleum additives, particularly detergent additives for engine fuels and dispersants for engine lubricants, to synthesize the amphiphilic compounds desired for such applications, functionalized polyisobutenes are very often relied on, most often with maleic anhydride. The polyisobutenyl succinic anhydrides sought are prepared according to three main processes. The first consists in the condensation of maleic anhydride on polyisobutene according to an ene-synthesis reaction. Such a reaction requires a high temperature (220°-235° C.) and the use of excess maleic anhydride so as to obtain yields on the order of 65 to 75% at the end of 24 hours. However, under these conditions resins appear that result from the polymerization of the maleic anhydride which requires a filtration stage, made very difficult by the consistency of these secondary products.

In a second type of process for producing polyisobutenyl succinic anhydride, a chlorination of the polyisobutene is first performed followed by the condensation of the chlorinated polyisobutene and of maleic anhydride. Despite the consumption of chlorine, this process competes with the preceding one thanks to a lowering of the reaction temperature, a better conversion and the absence of secondary reactions resulting in insoluble resins. However, this process usually results in products containing a certain amount of residual chlorine.

A third technique for producing polyisobutenyl succinic anhydride consists in having the polyisobutene and the maleic anhydride react in the presence of chlorine. This technique exhibits the advantage of being able to result in polyisobutenes containing more than 1 and up to 2 molecules of succinic anhydride per molecule of polyisobutene. Such a characteristic makes it possible to obtain, after reaction with polyethylene polyamines, products of polycondensation with a higher molecular weight than those resulting from the same reaction but using polyisobutenyl succinic anhydrides coming from the first two types of processes described. Such derivatives, of high molecular weight, are particularly appreciated in the field of the ashless dispersant additives for engine lubricants.

However, these products, like those resulting from the second process contain a residual amount of chlorine which excludes them from a number of increasingly important applications, considering the increasingly strict specifications relating to the amounts of chlorine of the petroleum additives, for environmental considerations.

The use in the first process described (ene-synthesis) of polyisobutenes that are more reactive with respect to maleic anhydride, particularly polyisobutenes whose content of "exo" double bonds is greater than 50%, has not made it possible to eliminate the formation of insoluble resins, requiring a filtration stage that is long, difficult and costly.

This invention proposes new polyfunctional polyisobutenes that are free of chlorine and that advantageously can be used for the preparation of petroleum additives, particularly detergents for engine fuels and ashless dispersants for engine lubricants.

These polyfunctional polyisobutenes, that can be used in particular after modification by amines, alcohols and/or amino alcohols, as additives in engine fuels and engine lubricants, can be defined generally as obtained by radical terpolymerization of isobutene, maleic anhydride, and polyisobutene.

The polyisobutenes used for this polymerization are preferably obtained in the presence of a catalyst that does not contain chlorine and that has a content of "exo" double bonds that is greater than 50%. Their average molecular weight in number is between 400 and 10000 and preferably between 400 and 3000.

The isobutene-maleic anhydride-polyisobutene terpolymerization reaction is conducted according to any technique that causes a radical mechanism to intervene but preferably in solution in an organic solvent, in the presence of a radical initiator at a temperature between 40° and 150° C. Of the radical initiators that can be used, there will be mentioned dicumyl peroxide, ditert-butyl peroxide, benzoyl peroxide, lauryl peroxide, lauryl hydroperoxide, tert-butyl hydroperoxide, azobisisobutyronitrile, sodium persulfate, diethyl peroxydicarbonate, diisopropyl peroxydicarbonate, dicyclohexyl peroxydicarbonate, tert-butyl peroxypivalate, tert-butyl perbenzoate, tert-butyl peroctoate, tertbutyl peracetate or 2,4-pentanedione peroxide. Ordinarily, the concentration of the radical initiator is between 0.05 and 0.5% by weight of the total weight of the reaction mixture.

Of the organic solvents that can be used, hexane, heptane, toluene and xylenes will be mentioned, but preference will be given to commercial cuts, preferably aromatic, or to a mineral oil such as 100 or 150 Neutral mineral oil. The content of solvent in the reaction mixture will be between 0 and 80% weight. The choice of solvent will be guided by the field of use of the final products (fuel additives or lubricant additives). Polyisobutene can also be this solvent in the absence of any other additional solvent.

The proportions of maleic anhydride, isobutene and polyisobutene in the reaction mixture will be selected so that the terpolymer obtained is soluble in the selected reaction solvent. Preferably, they will be selected so that the molar content of maleic anhydride is less than or at most equal to the isobutene+polyisobutene sum.

The terpolymers of the invention thus obtained can be modified to result in additives used in the petroleum field. Of the chemical agents used for these modifications, amines, polyamines, alcohols, polyols and amino alcohols will particularly be mentioned which will be advantageously selected from those that contain at most 10 carbon atoms.

Of the amines used, the following polyamines are more especially mentioned: dimethylamino-propylamine, diethylenetriamine, triethylenetetramine and tetraethylenepentamine, but preference will be given to mixtures with a base of dimethylamino-propylamine and polyethylene polyamines such as diethylenetriamine, triethylenetetramine, tetraethylenepentamine.

In a preferred method for producing the additives of the invention, the dimethylamino-propylamine will be added in a first stage and then the polyethylene polyamine, preferably tetraethylenepentamine, will be added to the reaction mixture.

Of the alcohols used, methanol, ethanol, isopropanol, ethylhexanol or polyols such as trimethylolpropane, pentaerythritol or dipentaerythritol will be mentioned.

Of the amino alcohols, preferably compounds will be used that have a primary amine function and from 1 to 3 hydroxyl functions, such as for example 2-amino-2-methyl-propanol or tris(hydroxymethyl)aminomethane.

These modification reactions of the functional polyisobutenes of the invention are conducted preferably in organic solvents used in the copolymerization stage at temperatures ordinarily between 60° and 250° C. and preferably between 80° and 200° C.

Generally, the additives of the invention can be used in fuels or in lubricants, alone or in combination with other conventional additives.

As detergent additives in fuels, they will be used in proportions going from 50 to 2000 ppm by weight and preferably from 100 to 1000 ppm by weight. In the case of detergents in gasolines, they will most often be combined with a carrier oil, preferably of the polyethylene glycol type or ethylene oxide-propylene oxide copolymer, and with other additives currently used in gasolines. In diesel fuels, the detergent additives of the invention can be used in combination with the additives generally used such as defoaming agent, antifoaming agent, anticorrosion agent, odor mask, cetane number improver and improver of the resistance to cold.

The invention additives can also be used as dispersant additives in lubricants alone or in combination with other conventional additives. In such an application, they can be used in proportions going from 0.1 to 20% by weight of the lubricant, depending on the usage for which the lubricant is intended and depending on the presence or absence of other additives, especially dispersants and/or detergents.

Ordinarily, their proportion can vary from 1 to 10% by weight of lubricant. The additives of the invention can be incorporated into various oils with mineral, synthetic or mixed bases, used for various purposes, such as lubricants for spark ignition or compression ignition internal combustion engines (such as, for example, automobile or truck engines, two-cycle engines, aircraft piston engines, marine engines or railroad diesels). Furthermore, fluids for automatic transmission, for gearing, for working of metals, for hydraulics, and greases can also benefit from the incorporation of the additives of the invention.

Normally, the products of the invention can be used in mixture with other conventional additives. These comprise products containing phosphorous or sulfur that improve the extreme-pressure properties, organometallic detergents, such as phenolate-sulfides, sulfonates and salicylates of alkaline-earth metals, ashless dispersants, thickening polymers, as well as antifreezing agents, oxidation inhibitors, anticorrosive, antirust, and antifoaming agents, etc.

The following examples illustrate the invention. Examples 2 and 3 are given by way of comparison.

EXAMPLE 1

In a reactor equipped with an agitation system, there are introduced:
- 786 g of an aromatic cut having a distillation initial point of 186° C. and a final point of 214° C.;
- 117.7 g of maleic anhydride;
- 600 g of polyisobutene with an average molecular weight in number close to 1000 and whose composition of end double bonds, determined by NMR, is as follows:

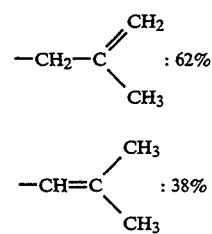

- 66 g of isobutene; and
- 3.1 g of tert-butyl per 2-ethyl hexanoate

The reaction mixture is agitated for 5 to 6 hours at 80°–85° C., resulting in a yellow-colored solution containing a mixture of 60% by weight of isobutene-maleic anhydride-polyisobutene terpolymer and 40% by weight of polyisobutene in solution in the aromatic cut used as solvent.

EXAMPLE 2 (COMPARISON)

If in example 1, all things being equal, the polyisobutene used is replaced with a polyisobutene of the same molecular weight but whose composition of end double bonds determined by NMR is as follows:

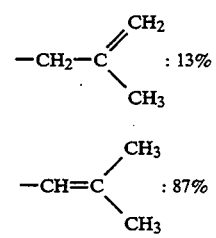

the reaction mixture obtained at the end of reaction is composed of the initial polyisobutene and of isobutene-maleic anhydride alternate copolymer that is insoluble in the solvent.

EXAMPLE 3 (COMPARISON)

If in example 1, all things being equal, the polyisobutene is not added, the reaction mixture obtained at the end of reaction is composed of isobutene-maleic anhydride alternate copolymer that is insoluble in the solvent used.

EXAMPLE 4

In a reactor equipped with an agitation system, there are introduced:
- 938 g of an aromatic cut having a distillation initial point of 186° C. and a final point of 214° C.;
- 117.7 g of maleic anhydride;
- 750 g of polyisobutene with an average molecular weight close to 1250 and whose composition of end double bonds, determined by NMR, is as follows:

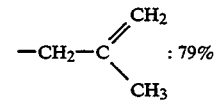

-continued

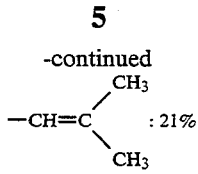 : 21%

66 g of isobutene; and 4.5 g of tert-butyl per 2-ethyl hexanoate.

The reaction mixture is agitated for 6 hours at 85° C., resulting in a mixture of 50% by weight of isobutene-maleic anhydride-polyisobutene terpolymer and 50% by weight of polyisobutene in solution in the solvent aromatic cut.

EXAMPLE 5

If in example 4, all things being equal, the solvent is replaced with a 150N mineral oil, a mixture of polyisobutene and of terpolymer in solution in said mineral oil is obtained.

EXAMPLE 6

To 200 g of the reaction mixture obtained in example 1 are added 3.7 g of dimethylamino-propylamine and 3.7 g of the aromatic cut used in example 1. The reaction mixture thus obtained is agitated for 2 hours at 160° C. To the reaction mixture is then added 6.8 g of tetraethylenepentamine and 6.8 g of the aromatic cut used in example 1 and it is agitated for 3 hours at 160° C. The mixture obtained has a nitrogen content of 1.6% and a TBN of 35. (TBN=Total Base Number).

EXAMPLE 7

To 395 g of the reaction mixture obtained in example 4 are added 5.8 g of dimethylamino-propylamine and 5.8 g of the aromatic cut used in example 4. The reaction mixture thus obtained is agitated for 2 hours at 160° C. and then added to it are 10.8 g of tetraethylenepentamine and 10.8 g of the aromatic cut used as solvent. After reaction for 3 hours at 160° C. The reaction mixture obtained has a nitrogen content of 1.3% and a TBN of 28.

EXAMPLE 8

In example 7, all things being equal, the initial terpolymer solution is replaced with the one obtained in example 5 and the solvent with a 150N mineral oil.

EXAMPLE 9

Series of engine tests are performed to evaluate the performance of the additives derived from the copolymers of the invention as detergents for fuels.

a) Diesel Fuel Detergent

A test of fouling of the injection nozzles on an XUD9 engine is performed by using as fuel a diesel fuel whose characteristics are detailed in Table 1.

The tendency for fouling is given by the average residual flowrate of the four injection nozzles, obtained after 6 hours of operation of the engine.

Fouling tests of the injection nozzles are performed by using the same diesel fuel but supplemented with 500 ppm of the solution obtained in example 6.

The results obtained in the two tests and collected in Table 2 show that at the end of the test, the injection nozzles having operated with the fuel containing the additive according to the invention are much less coked up than the injection nozzles having operated with the non-additive fuel.

b) Gasoline Detergent

A formulation having a base of 100 parts of the additive of example 6 and of 50 parts of polypropylene glycol with a molecular weight close to 1000 is prepared.

A series of engine tests is performed to evaluate the influence of the additives according to the invention to obtain a significant reduction in the deposits on the various elements of the engine, in particular at the level of the intake valves and the carburetor.

The test method relating to the cleanness of the carburetors uses a RENAULT R5 engine and lasts 12 hours (CEC F-03-T-81 method). The fuel used is a lead-free fuel. At the end of the test, the body of the butterfly valve of the carburetor is marked visually and a "MERIT" value is assigned to it. The merits obtained with the non-additive reference gasoline and the additive reference gasoline with 750 ppm of the formulation having a base of the additive of example 4 and of polypropylene glycol are respectively 5.8 and 9.2.

The test method performed to evaluate the influence of the additives of the invention on the cleanness of the intake valves uses an M 102 E type Mercedes engine and it operates cyclically according to a door to door scheme, for 60 hours. The reference fuel used is a lead-free fuel having a RESEARCH octane number of 96.8. Two tests are performed, the first in the absence of additive and the second in the presence of 750 ppm of the formulation having a base of the additive of example 6 and of polypropylene glycol.

The results obtained (Table 3) expressed by weight (gram) of deposits measured on the necks of each valve (intake chamber side), show that the amount of deposits on the intake valves obtained by using the formulation containing the additive according to the invention is clearly lower than that obtained in the absence of additive.

TABLE 1

| CHARACTERISTICS OF THE DIESEL FUEL USED IN EXAMPLE 9 | |
|---|---|
| Density | 0.834 g/ml |
| Sulfur Content | 0.29% weight |
| Turbidity Point °C. | 0 |
| LFT °C. | −6 |
| [LFT = Limiting Filtrability Temperature] | |
| Flow Point °C. | −9 |
| Cetane Number | 52 |
| Distillation | |
| - Initial Point | 179° C. |
| 5% | 203 |
| 10% | 214 |
| 20% | 234 |
| 30% | 251 |
| 40% | 266 |
| 50% | 280 |
| 60% | 294 |
| 70% | 309 |
| 80% | 326 |
| 90% | 349 |
| 95% | 367 |
| Final Point | 375 |

TABLE 2

| RESULTS OF FOULING OF INJECTION NOZZLES (XUD 9 - 6 hours) | | | |
|---|---|---|---|
| | | needle stroke (mm) | |
| average residual flowrate (%) | 0.1 | 0.2 | 0.3 |
| DIESEL FUEL (reference) | 14.5 | 18.6 | 26.3 |
| DIESEL FUEL + 500 ppm additive | 26.2 | 37.6 | 51,4 |

TABLE 2-continued

RESULTS OF FOULING OF INJECTION NOZZLES (XUD 9 - 6 hours)

|  | needle stroke (mm) | | |
|---|---|---|---|
| average residual flowrate (%) of example 6 | 0.1 | 0.2 | 0.3 |

TABLE 3

M 102 E TEST - AMOUNT OF DEPOSITS (in grams)

|  | without additive | with additive* |
|---|---|---|
| Content in ppm | 0 | 750 |
| valve 1 | 0.347 | 0.193 |
| valve 2 | 0.324 | 0.008 |
| valve 3 | 0.331 | — |
| valve 4 | 0.169 | 0.008 |
| Total | 1.171 | 0.209 |
| Deposit average/valve (g) | 0.293 | 0.052 |

*500 ppm of the solution of additive obtained in example 6 and 250 ppm of polypropylene glycol.

EXAMPLE 10

To 200 g of the reaction mixture obtained in example 5, 13 g of trimethylolpropane are added. The mixture is then brought to 160° C. for 8 hours.

EXAMPLE 11

To 200 g of the reaction mixture obtained in example 5, 12 g of tris(hydroxy)aminomethane are added. The mixture is then brought to 165° C. for 7 hours.

EXAMPLE 12

The products obtained in examples 8, 10 and 11 are added at a rate of 3% by weight of active materials to a formulated mineral oil but not containing ashless dispersant additive.

The dispersing effectiveness of the products of the invention is evaluated by the filter paper-spot test, in the presence of carbonaceous matter coming from a Diesel engine used oil. The ratio between the diameters of the black spot and the oil corona is determined at the end of 48 hours, the mixture having undergone, before depositing on the filter paper, various treatments. The conditions of the spot test and the results obtained are gathered in table 4. In this table also appear the results obtained under the same conditions, with the oil formulated in the absence of ashless dispersant additive (mixture 0).

Examination of the results appearing in table 4 shows that the additives of the invention exhibit an excellent dispersing effectiveness.

TABLE 4

| Product References of the example | Active Matter % by weight | 20° C. | 10 min 200° C. | 10 min 250° C. | +1% water | | |
|---|---|---|---|---|---|---|---|
|  |  |  |  |  | 20° C. | 1 min 200° C. | 10 min 200° C. |
| mixture (0) (*) (a) | 0 | 50 | 48 | 46 | 42 | 22 | 28 |
| Ex 8 | 3 | 69 | 75 | 75 | 71 | 77 | 76 |
| Ex 10 | 3 | 68 | 70 | 70 | 68 | 67 | 67 |
| Ex 12 | 3 | 70 | 75 | 74 | 72 | 76 | 76 |

(*) Comparison Test
(a) Oil formulated without ashless dispersant additive.

We claim:

1. Isobutene-maleic anhydride-polyisobutene terpolymer composition free of chlorine and soluble in liquid hydrocarbon medium, characterized in that it is obtained by radical terpolymerization of isobutene, maleic anhydride, and polyisobutene having an average content of end double bonds of at least 50% and an average molecular weight in number between 400 and 10000.

2. Composition according to claim 1, wherein said radical terpolymerization is conducted in an organic solvent, in the presence of a radical initiator, and at a temperature between 40° and 150° C.

3. Composition according to claim 2, wherein the concentration of radical initiator is between 0.05 and 0.5% by weight of the total weight of the reaction mixture.

4. Composition according to claim 2, wherein the content of solvent in the reaction mixture is at most 80% by weight.

5. Composition according to claim 1, wherein in its preparation, the molar amount of maleic anhydride is at most equal to the sum of the molar amounts of isobutene and polyisobutene.

6. Modified isobutene-maleic anhydride-polyisobutene terpolymer composition, wherein it is prepared from a composition according to claim 1 by reaction with at least one compound selected from amines, polyamines, alcohols, polyols and amino alcohols.

7. Modified composition according to claim 6, wherein, the isobutene-maleic anhydride-polyisobutene terpolymer composition is reacted first with dimethylamino-propylamine, and then with tetraethylenepentamine.

8. Modified composition according to claim 6, wherein said reaction is conducted in an organic solvent at a temperature between 60° and 250° C.

9. Fuel composition wherein it comprises a major proportion of fuel and a minor proportion of the modified isobutene-maleic anhydride-polyisobutene terpolymer composition of claim 6, wherein said minor proportion is effective to improve the detergent properties of said fuel.

10. Composition according to claim 9, wherein said fuel is a gasoline.

11. Composition according to claim 9, wherein said fuel is a diesel fuel.

12. Composition according to claim 9, wherein said minor proportion is 50 to 2000 ppm by weight.

* * * * *